(12) United States Patent
Itou et al.

(10) Patent No.: US 8,512,461 B2
(45) Date of Patent: Aug. 20, 2013

(54) INKJET INK AND INKJET INK MANUFACTURING METHOD

(75) Inventors: Tsuyoshi Itou, Shizuoka-ken (JP);
Takayasu Aoki, Shizuoka-ken (JP); Koji Imamiya, Kanagawa-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 135 days.

(21) Appl. No.: 13/093,207

(22) Filed: Apr. 25, 2011

(65) Prior Publication Data
US 2011/0259237 A1     Oct. 27, 2011

Related U.S. Application Data

(60) Provisional application No. 61/327,868, filed on Apr. 26, 2010.

(51) Int. Cl.
*C09D 11/02*     (2006.01)

(52) U.S. Cl.
USPC .................................. 106/31.32; 106/31.64

(58) Field of Classification Search
USPC ............................................ 106/31.32, 31.64
See application file for complete search history.

(56) References Cited

U.S. PATENT DOCUMENTS

| | | | | |
|---|---|---|---|---|
| 4,028,118 | A * | 6/1977 | Nakasuji et al. | 106/31.19 |
| 5,849,651 | A * | 12/1998 | Takayama et al. | 503/201 |
| 6,017,386 | A * | 1/2000 | Sano et al. | 106/31.32 |
| 6,203,603 | B1 * | 3/2001 | Takayama et al. | 106/31.16 |
| 2011/0183248 | A1 | 7/2011 | Kabai et al. | |

* cited by examiner

*Primary Examiner* — Kaj K Olsen
*Assistant Examiner* — Veronica F Faison
(74) *Attorney, Agent, or Firm* — Turocy & Watson, LLP

(57) ABSTRACT

A decolorizable inkjet ink includes a first particle that contains a color-forming compound, a color-developing agent, and a polar group-containing crystalline binder; and a second particle that contains a decoloring agent and a polar group-containing crystalline binder.

8 Claims, 1 Drawing Sheet

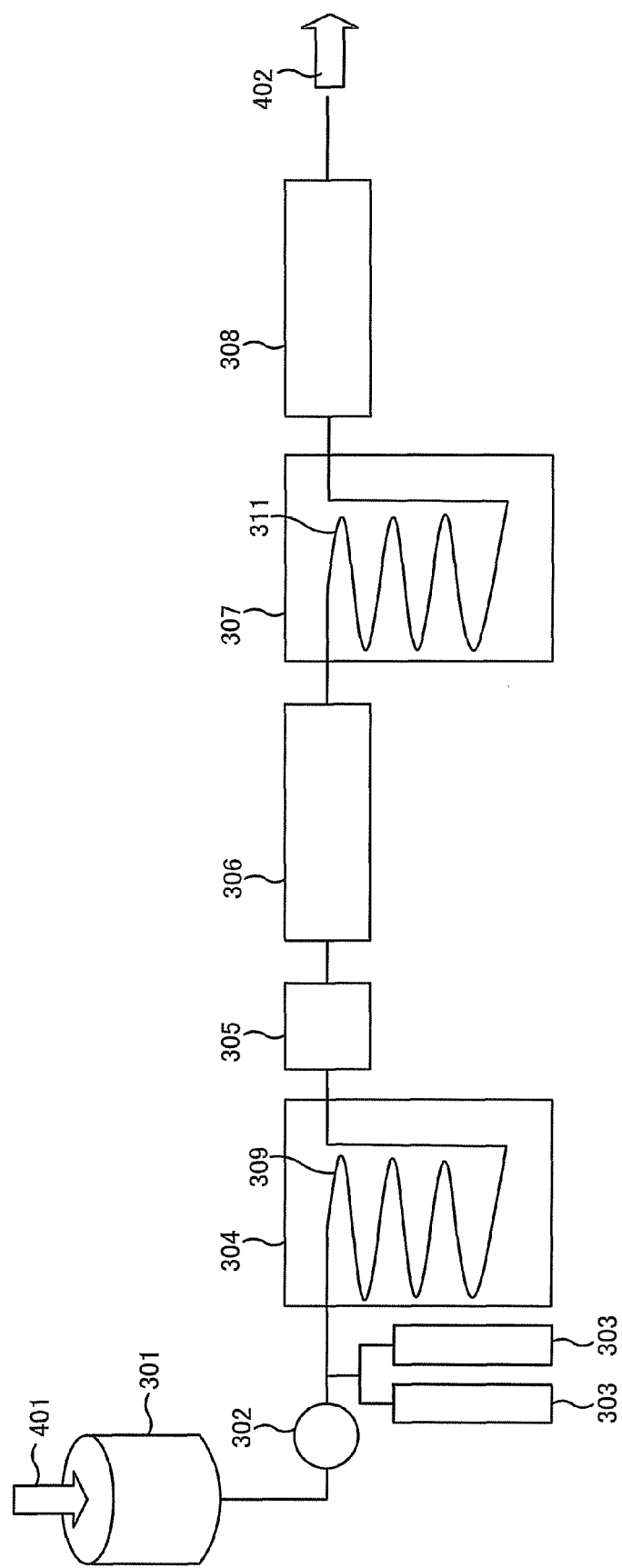

INKJET INK AND INKJET INK MANUFACTURING METHOD

CROSS-REFERENCE TO RELATED APPLICATION

This application is also based upon and claims the benefit of priority from U.S. provisional application 61/327,868, filed on Apr. 26, 2010; the entire contents of which are incorporated herein by reference.

FIELD

An embodiment described herein relates to techniques concerning decolorizable inkjet ink.

BACKGROUND

Methods that enable reuse of recording media such as paper by erasing the color of the toner- or ink-image formed on paper or other recording media are very effective from the viewpoint of environmental protection afforded by reduced amounts of paper or other recording media, and from the economical standpoint.

A decolorizable electrophotographic toner is known that contains a color-forming compound and a color-developing agent, and that can be decolored under heat. In this technique, the color-forming compound and the color-developing agent are incorporated into the toner using a knead pulverization method. The toner in a printed portion can be decolored by heating the printed paper at 100 to 200° C. for about 1 to 3 hours, and the decolored paper can be reused. The technique is outstanding in the sense that it can reduce paper consumption, and can thus contribute to reducing the environmental load.

The inkjet method is a non-electrophotographic image forming method. The characteristic of the inkjet method is that it does not involve heat history for the recording material as in the fusing in the electrophotographic method. The ink jet method is therefore very effective for materials to be erased by heat.

Decolorizable inkjet inks are proposed; however, decoloration is often time consuming, and the color density is not always sufficient.

DESCRIPTION OF THE DRAWINGS

FIG. 1 is a schematic diagram representing a configuration of a high-pressure atomizer.

DETAILED DESCRIPTION

A decolorizable inkjet ink of the presently described embodiment includes: a first particle that contains a color-forming compound, a color-developing agent, and a polar group-containing crystalline binder; and a second particle that contains a decoloring agent and a polar group-containing crystalline binder.

The embodiment is described below with reference to the accompanying drawing.

In the decolorizable inkjet ink, it is highly important how the color-forming compound, the color-developing agent, and the decoloring agent are mixed. Simply melt-mixing these three components results in either no color development or no decoloration, and it is very difficult to form an image by color development, or to erase the formed image by decoloration. In the inkjet ink of the present embodiment, the first particle containing the color-forming compound and the color-developing agent, and the second particle containing the decoloring agent are dispersed in an aqueous vehicle (water, or a mixed solvent of water and water-soluble organic solvent), and thus the first and second particles exist as separate particles. Because the color-forming compound, the color-developing agent, and the decoloring agent in these particles exist in a binder medium, for example, such as resin, the colored portion by the color-forming compound and the color-developing agent does not easily come into contact with the decolored portion by the decoloring agent. Thus, decoloration does not occur even upon mixing the first and second particles during the manufacture of the inkjet ink. Further, the influence of decoloring materials, such as surfactants and water-soluble polymers, that can be contained in the inkjet ink is small.

The dispersion of first and second particles as the inkjet ink of the present embodiment leaves the two kinds of particles on a recording medium as the aqueous vehicle evaporates upon printing the recording medium. Heating the recording medium at a temperature equal to or greater than the melting point or glass transition temperature Tg of the binder increases the binder fluidity, and causes the decolored portion by the decoloring agent and the colored portion by the color-forming compound and the color-developing agent to contact each other, making it possible to instantaneously erase the image.

Specifically, the inkjet ink of the present embodiment has superior color development (higher color density, and thus higher image density of a formed image), and superior decoloring capability (the ability to erase an image more instantaneously) over the related art.

The inkjet ink of the present embodiment is described below with regard to the ink components.

The binders contained in the first and second particles according to the present embodiment are crystalline compounds that have a polar group. (The binder according to the present embodiment is referred to as "polar group-containing crystalline binder".) The polar group is a functional group or a bond, such as a carboxyl group, a hydroxyl group, an ester bond, and an amide bond. The polar group improves the dispersibility of the color-developing agent and the decoloring agent in the binder, and thus improves the color density for color development, and makes the erasure less noticeable in decoloration.

With the crystalline compound binder, color-rich particles can be obtained. Further, because the binder melts in shorter time periods in decoloration, the contact speed of the color component (formed by the binding of the color-forming compound and the color-developing agent) and the decolor component (decoloring agent) is fast, and the ink can be decolored instantaneously. As used herein, the "crystalline compound" refers to compounds in which the ratio of the melting point and an endothermic maximum peak temperature measured by a differential scanning calorimeter (melting point/endothermic maximum peak temperature) ranges from 0.6 to 1.4, preferably 0.7 to 1.2, more preferably 0.9 to 1.2. For example, a flow tester CFT-500D (Shimadzu Corporation) is used for the measurement of melting point. Measurement conditions are as follows: Load, 10 kg/cm$^2$; die hole diameter, 1.0 mm; die length, 1.0 mm; rate of temperature increase, 2.5° C./min. A sample is prepared by molding 1.5 g of toner with molding equipment. The melting point is the temperature at which a half of the sample flows out in plotting the fall of a plunger. For the measurement of endothermic maximum peak temperature, a Q-2000 (TA Instruments Japan) is used, for example. 5 mg of a sample is weighed on an aluminum pan, and heated to 180° C. at the rate of temperature increase 10° C./min. The highest temperature for the endothermic peaks obtained by heating the sample again under the same conditions is then used as the endothermic maximum peak temperature.

Examples of the polar group-containing crystalline binder include crystalline polyester, acid modified polyethylene, acid modified polypropylene; plant waxes such as candelilla wax, carnauba wax, Japan wax, jojoba wax, and rice wax; animal waxes such as beewax, lanolin, and whale wax; mineral waxes such as ozokerite, ceresin, and petrolatum; waxes containing fatty acid esters as the main component, such as montanoic acid ester wax, and castor wax; and partially or entirely deoxidized fatty acid esters such as deoxidized carnauba wax. Other examples include saturated linear fatty acids such as palmitic acid, stearic acid, montanoic acid, and long-chain alkyl carboxylic acids having an even longer chain alkyl group; unsaturated fatty acids such as brassidic acid, eleostearic acid, and parinaric acid; polyhydric alcohols, including saturated alcohols such as stearyl alcohol, eicosyl alcohol, behenyl alcohol, carnaubyl alcohol, ceryl alcohol, melissyl alcohol, and long-chain alkyl alcohols having an even longer chain alkyl group, and sorbitol; fatty acid amides such as linoleic acid amide, oleic acid amide, and lauric acid amide; saturated fatty acid bisamides such as methylenebisstearic acid amide, ethylenebiscapric acid amide, ethylenebislauric acid amide, and hexamethylenebisstearic acid amide; unsaturated fatty acid amides such as ethylenebisoleic acid amide, hexamethylenebisoleic acid amide, N,N'-dioleyl adipic acid amide, and N,N'-dioleyl sebacic acid amide; aromatic bisamides such as m-xylenebisstearic acid amide, and N,N'-distearyl isophthalic acid amide; fatty acid metal salts such as calcium stearate, calcium laurate, zinc stearate, and magnesium stearate (generally known as metal soaps); waxes obtained by grafting vinyl monomers such as styrene and acrylic acid to aliphatic hydrocarbon waxes; partially esterified products of fatty acid and polyhydric alcohol, such as behenic acid monoglyceride; and hydroxyl group-containing methyl ester compounds obtained by hydrogenating vegetable oils and fats.

These may be used either alone or in combinations of two or more. Compounds having a predetermined melting point are selected according to such factors as the temperature set for decoloration. In practice, the desired melting point ranges from 40° C. to 200° C., inclusive. Preferably, the molecular weight (weight average molecular weight) ranges from 200 to 10,000, inclusive, from the standpoint of obtaining sharp solubility.

Examples of the color-forming compound according to the present embodiment include leuco dyes. Leuco dyes are electron donating compounds capable of developing color with the color-developing agent. Examples of leuco dyes include diphenylmethane phthalides, phenylindolyl phthalides, indolyl phthalides, diphenylmethane azaphthalides, phenylindolyl azaphthalides, fluorans, styryl quinolines, and diazarhodamine lactones.

Specific examples include 3,3-bis(p-dimethylaminophenyl)-6-dimethylaminophthalide, 3-(4-diethylaminophenyl)-3-(1-ethyl-2-methylindol-3-yl)phthalide, 3,3-bis(1-n-butyl-2-methylindol-3-yl)phthalide, 3,3-bis(2-ethoxy-4-diethylaminophenyl)-4-azaphthalide, 3-(2-ethoxy-4-diethylaminophenyl)-3-(1-ethyl-2-methylindol-3-yl)-4-azaphthalide, 3-[2-ethoxy-4-(N-ethylanilino)phenyl]-3-(1-ethyl-2-methylindol-3-yl)-4-azaphthalide, 3,6-diphenylaminofluoran, 3,6-dimethoxyfluoran, 3,6-di-n-butoxyfluoran, 2-methyl-6-(N-ethyl-N-p-tolylamino) fluoran, 2-N,N-dibenzylamino-6-diethylaminofluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1,2-benz-6-diethylaminofluoran, 1,2-benz-6-(N-ethyl-N-isobutylamino) fluoran, 1,2-benz-6-(N-ethyl-N-isoamylamino)fluoran, 2-(3-methoxy-4-dodecoxystyryl)quinoline, spiro[5H-(1) benzopyrrano(2,3-d)pyrimidine-5,1'(3'H)isobenzofuran]-3'-one,2-(diethylamino)-8-(diethylamino)-4-methyl-, spiro [5H-(1)benzopyrrano(2,3-d)pyrimidine-5,1'(3'H) isobenzofuran]-3'-one,2-(di-n-butylamino)-8-(di-n-butylamino)-4-methyl-, spiro[5H-(1)benzopyrrano(2,3-d) pyrimidine-5,1'(3'H)isobenzofuran]-3'-one,2-di-n-butylamino)-8-(diethylamino)-4-methyl-, spiro[5H-(1) benzopyrrano(2,3-d)pyrimidine-5,1'(3'H)isobenzofuran]-3'-one,2-(di-n-butylamino)-8-(N-ethyl-N-1-amylamino)-4-methyl-, spiro[5H-(1)benzopyrrano(2,3-d)pyrimidine-5,1' (3'H)isobenzofuran]-3'-one,2-(di-n-butylamino)-8-(di-n-butylamino)-4-phenyl, 3-(2-methoxy-4-dimethylaminophenyl)-3-(1-butyl-2-methylindol-3-yl)-4,5, 6,7-tetrachlorophthalide, 3-(2-ethoxy-4-diethylaminophenyl)-3-(1-ethyl-2-methylindol-3-yl)-4,5,6, 7-tetrachlorophthalide, and 3-(2-ethoxy-4-diethylaminophenyl)-3-(1-pentyl-2-methylindol-3-yl)-4,5,6, 7-tetrachlorophthalide. Other examples include pyridine, quinazoline, and bisquinazoline compounds. These may be used as a mixture of two or more.

The concentration of the color-forming compound in the first particle is preferably 0.5 to 20%, particularly preferably 1 to 10%. Less than 0.5%, the color density lowers from the levels obtained in these ranges. Above 20%, the measured image density after decoloration increases from the levels obtained in these ranges.

The color-developing agent used in the present embodiment is an electron-accepting compound that donates a proton to the leuco dye. Examples of the color-developing agent include phenols, phenol metal salts, carboxylic acid metal salts, aromatic carboxylic acids, aliphatic carboxylic acids of 2 to 5 carbon atoms, benzophenones, sulfonic acids, sulfonates, phosphoric acids, phosphoric acid metal salts, acidic phosphoric acid esters, acidic phosphoric acid ester metal salts, phosphorous acids, phosphorous acid metal salts, monophenols, polyphenols, 1,2,3-triazole and derivatives thereof, either unsubstituted or substituted with substituents such as an alkyl group, an aryl group, an acyl group, an alkoxycarbonyl group, a carboxy group, esters or amides thereof, and a halogen group. Other examples include bis-, tris-phenols, phenol-aldehyde condensate resins, and metal salts of these. These may be used as a mixture of two or more.

Specific examples include phenol, o-cresol, tertiary-butylcatechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, benzyl p-hydroxybenzoate, dihydroxybenzoic acids and esters thereof (for example, 2,3-dihydroxybenzoic acid, methyl 3,5-dihydroxybenzoate), resorcin, gallic acid, dodecyl gallate, ethyl gallate, butyl gallate, propyl gallate, 2,2-bis(4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)n-hexane, 1,1- bis(4-hydroxyphenyl)n-heptane, 1,1-bis(4-hydroxyphenyl) n-octane, 1,1-bis(4-hydroxyphenyl)n-nonane, 1,1-bis(4-hydroxyphenyl)n-decane, 1,1-bis(4-hydroxyphenyl)n-dodecane, 2,2-bis(4-hydroxyphenyl)butane, 2,2-bis(4-hydroxyphenyl)ethylpropionate, 2,2-bis(4-hydroxyphenyl)-4-methylpentane, 2,2-bis(4-hydroxyphenyl)hexafluoropropane, 2,2-bis(4-hydroxyphenyl)n-heptane, 2,2-bis(4-hydroxyphenyl)n-nonane, 2,4-dihydroxyacetophenone, 2,5-dihydroxyacetophenone, 2,6-dihydroxyacetophenone, 3,5-dihydroxyacetophenone, 2,3,4-trihydroxyacetophenone, 2,4-dihydroxybenzophenone, 4,4'-dihydroxybenzophenone, 2,3,4-trihydroxybenzophenone, 2,4,4'-trihydroxybenzophenone, 2,2',4,4'-tetrahydroxybenzophenone, 2,3,4,4'-tetrahydroxybenzophenone, 2,4'-biphenol, 4,4'-biphenol, 4-[(4-hydroxyphenyl)methyl]-1,2,3-benzenetriol, 4-[(3,5-dimethyl-4-hydroxyphenyl)methyl]-1,2,3-benzenetriol, 4,6-bis[(3,5-dimethyl-4-hydroxyphenyl)methyl]-1,2,3-benzenetriol, 4,4'-[1,4-phenylenebis(1-methylethylidene)bis(benzene-1,2,3-triol)], 4,4'-[1,4-phenylenebis(1-methylethylidene)bis(1,2-benzenediol)], 4,4',4''-ethylidenetrisphenol, 4,4'-(1-methylethylidene)bisphenol, and methylenetris-p-cresol.

The color-developing agent according to the present embodiment is desirably a polymer color-developing agent. Low molecular weight color-developing agents tend to lower color density during the atomization. Specifically, the color-developing agent preferably has a phenolic hydroxyl group on the molecular chain, and a molecular weight of at least 1,000 (in other words, a molecular weight of 1,000 or more). The phenolic hydroxyl group can donate a proton to the leuco dye for color development. Further, with a molecular weight of 1,000 or more, the solubility for the aqueous dispersion medium lowers, and the color density increases. More specifically, the color-developing agent may be a dehydration condensation product of a 2,2-bis(hydroxymethyl)-1,3-propanediol polycondensate and 4-hydroxybenzoic acid, or, in terms of commercially available products, Adeka Arkls K-5 (Adeka).

It is preferable that the color-developing agent be used in 0.5 parts by mass or more and 10 parts by mass or less, particularly 1 part by mass or more and 5 parts by mass or less with respect to 1 part by mass of the color-forming compound. With the content range from 0.5 parts by mass to 10 parts by mass, the color density can be increased more than that possible with the content less then 0.5 parts by mass, and the original image can be made less noticeable by decoloration than that possible with the content exceeding 10 parts by mass.

The decoloring agent used in the present embodiment may be a known decoloring agent, provided that the color-forming compound, the color-developing agent, and the decoloring agent are all present, and that the decoloring agent can erase color by inhibiting the chromogenic reaction between the leuco dye and the color-developing agent under the predetermined temperature of heat applied to these three components.

Specific examples of decoloring agent include aliphatic higher alcohol, polyethylene glycol, non-ionic surfactants, cationic surfactants, and hindered amine derivatives.

Examples of hindered amine derivatives include tetrakis(1,2,2,6,6-pentamethyl-4-piperidyl)1,2,3,4-butanetetracarboxylate, tetrakis(2,2,6,6-tetramethyl-4-piperidyl)butane-1,2,3,4-butanetetracarboxylate, a condensate of 1,2,3,4-butanetetracarboxylic acid, 1,2,2,6,6-pentamethyl-4-piperidinol, and β,β,β,β-tetramethyl-3,9-(2,4,6,8,10-tetraoxaspiro[5,5]undecane)diethanol, bis(2,2,6,6-tetramethyl-4-piperidyl)sebacate, and tetrakis(1,2,2,6,6-pentamethyl-4-piperidyl)1,2,3,4-butanetetracarboxylate. In terms of commercially available products, examples of hindered amine derivatives include CHIMASSORB 2020 FDL, CHIMASSORB 944 FDL, TINUVIN 622 LD, TINUVIN 144, TINUVIN 765, TINUVIN 770 DF, TINUVIN 111 FDL, TINUVIN 783 FDL, TINUVIN 783 FDL, TINUVIN 791 FB (all available from Ciba Speciality Chemicals), and Adek Stab LA52, Adek Stab LA57, Adek Stab LA63P, Adek Stab LA77Y, Adek Stab LA68LD, Adek Stab LA77G, Adek Stab LA402XP, Adek Stab LA502XP, Adeka Arkls DN-44M (all available from Adeka).

Examples of non-ionic surfactants include polyoxyethylene alkylether, polyoxyalkylene alkylether, polyoxyethylene derivatives, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene hydrogenated castor oil, polyoxyethylene alkylamine, and alkylalkanolamide.

Examples of cationic surfactants include alkylamine salts, and alkylquarternary ammonium salts.

Examples of aliphatic higher alcohols include lauryl alcohol, stearyl alcohol, myristyl alcohol, and cetyl alcohol.

The decoloring agents known from, for example, JP-A-2000-19770 also can be used. Examples include cholesterol, stigmasterol, pregnenolone, methylandrostenediol, estradiol benzoate, epiandrosterone, stenolon, β-sitosterol, pregnenoloneacetate, β-cholestanol, 5,16-pregnadien-3β-ol-20-one, 5α-pregnen-3β-ol-20-one, 5-pregnen-3β,17-diol-20-one-21-acetate, 5-pregnen-3β,17-diol-20-one-17-acetate, 5-pregnen-3β,21-diol-20-one-21-acetate, 5-pregnen-3β,17-diol diacetate, rockogenin, tigogenin, esmilagenin, hecogenin, diosgenin, cholic acid, cholic acid methyl ester, sodium cholate, lithocholic acid, lithocholic acid methyl ester, sodium lithocholate, hydroxycholic acid, hydroxycholic acid methyl ester, hyodeoxycholic acid, hyodeoxycholic acid methyl ester, testosterone, methyltestosterone, 11α-hydroxymethyltestosterone, hydrocortisone, cholesterol methyl carbonate, α-cholestanol, D-glucose, D-mannose, D-galactose, D-fructose, L-sorbose, L-rhamnose, L-fucose, D-ribodesose, α-D-glucose pentaacetate, acetoglucose, diacetone-D-glucose, D-glucuronic acid, D-galacturonic acid, D-glucosamine, D-fructosamine, D-isosaccharic acid, vitamin C, erythorbic acid, trehalose, saccharose, maltose, cellobiose, gentiobiose, lactose, melibiose, raffinose, gentianose, melezitose, stachyose, methyl α-glucopyranoside, salicin, amygdalin, euxanthic acid, cyclododecanol, hexahydrosalicylic acid, menthol, isomenthol, neomenthol, neoisomenthol, carbomenthol, α-carbomenthol, piperitol, α-terpineol, β-terpineol, γ-terpineol, 1-p-menthen-4-ol, isopulegol, dihydrocarveol, carveol, 1,4-cyclohexanediol, 1,2-cyclohexanediol, phloroglucitol, quercitol, inositol, 1,2-cyclododecanediol, quinic acid, 1,4-terpine, 1,8-terpine, pinol hydrate, betulin, borneol, isoborneol, adamantanol, norborneol, fenchol, camphor, and 1,2:5,6-diisopropylidene-D-mannitol.

Of these decoloring agent compounds, basic compounds, particularly hindered amine derivatives are preferably used for their fast decoloring speed and high decoloring capability (the ability to lower image density). For safety, the molecular weight is preferably 200 or more. The upper limit of the molecular weight is not particularly limited, and is preferably 10,000 or less from the standpoint of the solubility in the binder.

Preferably, the decoloring agent is used in 0.1 parts by mass or more and 100 parts by mass or less, particularly 0.5 parts by mass or more and 10 parts by mass or less with respect to 1 part by mass of the color-forming compound. With the content range from 0.1 parts by mass to 100 parts by mass, the image density after erasing becomes lower than that possible with the content less than 0.1 parts by mass, and the image density after the printing (before erasing) becomes higher than that possible with the content above 100 parts by mass.

The content of the decoloring agent in the second particle is not particularly limited, and may be appropriately set by a skilled artisan. For example, the decoloring agent content is set to 1 to 50%.

The aqueous vehicle used as the dispersion medium of the first and second particles in the present embodiment is not particularly limited, and may be appropriately set by a skilled artisan. Desirably, the aqueous vehicle is one that does not dissolve the binder in the particles. Specifically, water, organic solvents such as methanol, ethanol, isopropyl alcohol, n-butanol, s-butanol, t-butanol, and 2-ethylhexanol, and mixtures thereof can be used.

A surfactant may be used to form the first and second particles of the present embodiment. Alcohol-, and amine-based surfactants have decoloring action, and thus measures need to be taken to prevent decoloration during the formation of the particles. For this reason, anionic surfactants are preferably used as the surfactant used in the present embodiment. Examples of anionic surfactants include fatty acid salt, alkylsulfuric acid ester salt, polyoxyethylene alkylether sulfate ester salt, alkylbenzenesulfonate, alkylnaphthalenesulfonate, dialkyl sulfosuccinate, alkyldiphenylether disulfonate, polyoxyethylene alkylether phosphate, alkenyl succinate, alkanesulfonate, naphthalene sulfonic acid formalin condensate salt, aromatic sulfonic acid formalin condensate salt, polycarboxylic acid, and polycarboxylate.

Further, in the present embodiment, known additive materials for inkjet ink may be used, as required. Examples of such additives include drying preventing agents, dispersion stabilizers, defoaming agents, wetting agents, and thickeners.

From the standpoint of suppressing clogged nozzles and preventing particle sedimentation in the ink, the first and second particles of the present embodiment preferably have a volumetric median diameter (D50) of less than 1 μm, as measured by a laser diffraction scattering method (hereinafter, also referred to simply as "particle size" or "volume average diameter"). The lower limit of particle size is not particularly limited, and is preferably greater than 0.05 μm from the standpoint of image density.

The laser diffraction scattering method is the method that determines a particle size distribution based on the intensity distribution patterns of the diffracted and scattered light resulting from the irradiation of a particle group with a laser beam. In the present embodiment, the particle sizes of the first and second particles can be measured using, for example, an SALD 7000 (Shimadzu Corporation).

Further, the proportions of the first and second particles in the inkjet ink of the present embodiment are not particularly limited, and can be appropriately set by a skilled artisan. For example, the proportion of the second particle may be 0.1 to 50 parts by mass with respect to 1 part by mass of the first particle.

The following describes exemplary steps in an inkjet ink manufacturing method of the present embodiment.

The inkjet ink of the present embodiment can be manufactured as follows, for example. A dispersion of the first particle in an aqueous vehicle is prepared with the color-forming compound, the color-developing agent, and the polar group-containing crystalline binder being contained in the first particle (hereinafter, referred to as "first dispersion"). A dispersion of the second particle in an aqueous vehicle is also prepared with the decoloring agent and the polar group-containing crystalline binder being contained in the second particle (hereinafter, "second dispersion"). The first and second dispersions are then mixed to each other.

In the present embodiment, as described above, the first and second particles preferably have particle sizes of 1 μm or less.

The first and second particles can be manufactured using a high-pressure atomizer, for example, such as Nanomizer (Yoshida Kikai Co., Ltd.), Ultimaizer (Sugino Machine Limited), NANO 3000 (Beryu Co., Ltd.), Microfluidizer (Mizuho Industrial Co., Ltd.), and homogenizer (Izumi Food Machinery Co., Ltd.); a rotor stirrer, for example, such as Ultra-Turrax (IKA Japan), TK autohomomixer (Primix Corporation), TK pipeline homomixer (Primix Corporation), TK fillmix (Primix Corporation), Clearmix (M Technique Co., Ltd.), Clear SS5 (M Technique Co., Ltd.), Cavitron (Eurotec Co., Ltd.), and Fine Flow Mill (Pacific Machinery & Engineering Co., Ltd.); and a media stirrer, for example, such as Viscomill (Imex), Apexmill (Kotobuki Industries Co., Ltd.), Star Mill (Ashizawa Finetech Ltd.), DCPSuper Flow (Nippon Eirich Co., Ltd.), MP Mill (Inoue Manufacturing Co., Ltd.), Spike Mill (Inoue Manufacturing Co., Ltd.), Mighty Mill (Inoue Manufacturing Co., Ltd.), and SC Mill (Mitsui Kozan).

The first and second particles manufactured with a high-pressure atomizer can easily have particle sizes of less than 1 μm, and a sharp grain size distribution.

FIG. 1 shows a schematic illustration of an example of a high-pressure atomizer used in the present embodiment.

The high-pressure atomizer is an apparatus that forms fine particles by applying a shear through micronozzles under the pressure of 10 MPa to 300 MPa applied by a high-pressure pump.

As illustrated in FIG. 1, the high-pressure atomizer includes, for example, a hopper 301, a liquid supply pump 302, high-pressure pumps 303, a heating unit 304, an atomizing unit 305, a depressurizing unit 306, a cooling unit 307, and a depressurizing unit 308, disposed in order, and pipes connecting these components. The arrows 401 and 402 indicate the direction of travel through these components.

The hopper 301 is a tank (raw material charging unit) charged with a process liquid (a dispersion of the components forming the first or second particle according to the present embodiment). While the apparatus is running, the tank needs to be filled with the liquid so as not to send air into the apparatus. A stirrer may be optionally provided if the particles in the dispersion have large particle sizes and are likely to result in sedimentation.

The liquid supply pump 302 is installed to continuously send the process liquid to the high-pressure pumps 303. The liquid supply pump 302 is also effective at avoiding clogging of the check valves (not illustrated) provided in the high-pressure pumps 303. The liquid supply pump 302 may be realized by, for example, a diaphragm pump, a tubing pump, or a gear pump.

The high-pressure pumps 303 are plunger pumps, and have check valves for a process liquid inlet and a process liquid outlet (neither is shown). One to ten plungers are used, depending on production scale. Preferably, at least two plungers are used to reduce a pulsating flow as much as possible.

The heating unit 304 includes a high-pressure pump 309 installed, for example, in a spiral fashion to increase the heat exchange area in a heating unit such as an oil bath. The heating unit 304 may be disposed either upstream or downstream of the high-pressure pumps 303 with respect to the flowing direction of the dispersion, but needs to be at least upstream of the atomizing unit 305. With the heating unit 304 installed upstream of the high-pressure pumps 303, a heater may be provided for the hopper 301. However, because it increases the residence time under high temperature, the hydrolysis of the binder becomes likely.

The atomizing unit 305 includes small-diameter nozzles used to apply a strong shear. Though the nozzles may have various diameters and shapes, the nozzle diameter is desirably 0.05 mm to 0.5 mm, and passage or collision nozzles are desirable. Further, the nozzles may be configured in multi-stages, in which case nozzles with different diameters may be disposed adjacent to each other. The nozzles may be disposed side by side, or in series. Materials, such as diamond, that can withstand high pressure are used for the nozzles.

The cooling unit 307 includes a pipe 311 formed in a spiral fashion to increase the heat exchange area in the bath in which the cold water is continuously flown.

The depressurizing units 306 and 308 are optionally provided on the preceding and following stages, respectively, of the cooling unit 307. The depressurizing units 306 and 308 are configured to include one or more cells having channels larger than the nozzle diameter of the atomizing unit 307 and smaller than the connecting pipe diameter, or one or more two-way valves.

The high-pressure atomizer operates as follows.

First, a dispersion containing the constituting components of the first or second particle charged into the hopper 301 is sent to the heating unit 304, where the dispersion is heated. The heating temperature needs to be at least the melting point of the binder, and may be set taking into consideration factors such as the melting characteristic of the binder. While low temperatures are sufficient for binders that melt easily, high temperatures are required for binders that are hard to melt. In a method that involves heating the dispersion continuously through the heat-exchange unit, the flow rate of the dispersion and the length of the heat-exchange pipe need to be taken into account in the temperature setting. High flow rates or short pipes require high temperature, whereas low temperature is sufficient for slow flow rates or long pipes, which can sufficiently heat the dispersion.

The particles in the dispersion containing the heated and melted polar group-containing crystalline binder are sheared in the atomizing unit 305 under a pressure of 10 MPa or more. Specifically, the particles are sheared with the nozzles provided in the high-pressure atomizer. The particles in the dispersion are atomized as they pass through the nozzles under the high pressure of 10 MPa or more. The pressure may range from 10 MPa to 300 MPa.

Finally, the dispersion is cooled to a temperature equal to or less than the melting point of the binder in the cooling unit 307. The cooling solidifies the melted fine particles. Because the cooling of the process liquid is rapid, the cooling is unlikely to cause agglomeration or merging.

As required, back pressure or reduced pressure may be applied before or after the cooling in the cooling unit 307. Applying back pressure or reduced pressure means that the pressure is reverted to near the atmospheric pressure not upon the passage through the nozzles but in a single step (back pressure) or in multiple steps (reduced pressure). The pressure after the passage through the back pressure unit or the depressurizing unit is 0.1 MPa to 10 MPa, desirably 0.1 to 5 MPa. More preferably, the depressurizing unit is configured to include cells or valves of different diameters. By reducing pressure in steps, fine particles having a sharp particle size distribution with fewer coarse particles can be obtained.

This completes the preparation of the first or second dispersion.

The first and second dispersions obtained as above are mixed to provide the inkjet ink of the present embodiment.

The mixing ratio of the first and second dispersions may be appropriately set by a skilled artisan according to the proportions of the first and second particles.

For the preparation of the first particle, the constituting components may be heated prior to sending the particles to the high-pressure atomizer, so as to develop color by the reaction of the color-forming compound and the color-developing agent. For example, after developing color by heating the mixture of the color-forming compound, the color-developing agent, and the polar group-containing crystalline binder, these components may be pulverized with a mixer or the like to obtain a first particle composition. In this case, the composition is charged into the hopper 301 in the particle forming step.

The inkjet ink of the present embodiment can be used in inkjet recording image forming apparatus as with common inkjet inks.

The inkjet recording method is not limited, as long as it uses the temperature that does not melt the binder according to the present embodiment. Examples of inkjet recording method include the charge control method that ejects ink using electrostatic attraction, the acoustic inkjet method that ejects ink under radiation pressure by irradiating the ink with an acoustic beam produced from an electric signal, the drop on-demand method that uses the oscillation pressure of a piezoelectric element, and a thermal inkjet (bubble jet) method that uses the pressure created by the formation of bubbles from the heated ink.

The image formed with the inkjet ink of the present embodiment can be erased by subjecting a recording medium with the image to decoloration under heat. The heating temperature in the decoloration may be, for example, 180° C., though it depends on such factors as the melting point or glass transition temperature Tg of the binder used.

EXAMPLES

The inkjet ink of the present embodiment is described below based on Examples. It should be noted, however, that the embodiment is in no way limited by the following Examples.

In Examples 1 to 3, the first and second particles were obtained by producing fine particles using a high-pressure atomizer, for which the NANO 3000 (Beryu Co., Ltd.) was used. The NANO 3000 includes the hopper 301, the heating unit 304, the atomizing unit 305, the depressurizing unit 306, and the cooling unit 307. The heating unit 304 has a 12-m heat-exchange high-pressure pipe immersed in an oil bath. The atomizing unit (pressurizing unit) 305 includes a high-pressure pipe with a succession of 0.13-μm and 0.28-μm nozzles. The depressurizing unit 306 includes a medium-pressure pipe with a succession of 0.4-, 1.0-, 0.75-, 1.5-, and 1.0-μm hole diameter cells. The cooling unit 307 includes a 12-m heat-exchange pipe having a cooling capability using tap water. The NANO 3000 was used to produce fine particles under 150 MPa and 180° C. conditions.

The particle size was measured using an SALD 7000 (Shimadzu Corporation).

The image density was measured using a Macbeth concentration meter (Gretag Macbeth, blue filter).

Production of First Particle A1
Melt Mixture Production

The following components were heat mixed at 180° C., cooled, and pulverized with a mixer to obtain a blue melt mixture (powder).

3,3-Bis(p-dimethylaminophenyl)-6-dimethylaminophthalide: 5 g
Adeka Arkls K5: 10 g
Crystalline polyester (melting point, 100° C.): 35 g Production of First Dispersion The following components were mixed to each other.
Melt mixture: 50 g (produced as above)
1% Sodium dodecylbenzene sulfonate aqueous solution: 440 g
10% Sodium hydroxide aqueous solution: 10 g Fine particles were then produced using the high-pressure atomizer (NANO 3000). The resulting blue first particles had a volume average diameter of 0.4 μm. In the following, the dispersion will be referred to as "first particle A1 dispersion". The same denotation also may be used for other particle dispersions.

Production of First Particle A2

Melt Mixture Production

The following components were heat mixed at 180° C., cooled, and pulverized with a mixer to obtain a blue melt mixture (powder).
3,3-Bis(p-dimethylaminophenyl)-6-dimethylaminophthalide: 5 g
Adeka Arkls K5: 10 g
Stearic monoamide (melting point, 100° C.): 35 g Production of First Dispersion The following components were mixed to each other.
Melt mixture: 50 g (produced as above)
1% Sodium dodecylbenzene sulfonate aqueous solution: 440 g Fine particles were then obtained using the high-pressure atomizer (NANO 3000). The resulting blue first particles had a volume average diameter of 0.2 μm.

Production of First Particle A3

Melt Mixture Production

The following components were heat mixed at 180° C., cooled, and pulverized with a mixer to obtain a blue melt mixture (powder).
3,3-Bis(p-dimethylaminophenyl)-6-dimethylaminophthalide: 5 g
Bisphenol A: 10 g
Crystalline polyester (melting point, 100° C.): 35 g Production of First Dispersion The following components were mixed to each other.
Melt mixture: 50 g (produced as above)
1% Sodium dodecylbenzene sulfonate aqueous solution: 440 g
10% Sodium hydroxide aqueous solution: 10 g Fine particles were then obtained using the high-pressure atomizer (NANO 3000). The resulting blue first particles had a volume average diameter of 0.4 μm.

Production of Second Particle B1

Melt Mixture Production

The following components were heat mixed at 180° C., cooled, and pulverized with a mixer to obtain a white melt mixture (powder).
Adek Stab LA63P: 15 g
Crystalline polyester (melting point, 100° C.): 35 g Production of Second Dispersion The following components were mixed to each other.
Melt mixture: 50 g (produced as above)
1% Sodium dodecylbenzene sulfonate aqueous solution: 440 g
10% Sodium hydroxide aqueous solution: 10 g Fine particles were then obtained using the high-pressure atomizer (NANO 3000). The resulting white second particles had a volume average diameter of 0.3 μm.

Production of Second Particle B2

Melt Mixture Production

The following components were heat mixed at 180° C., cooled, and pulverized with a mixer to obtain a white melt mixture (powder).
Adek Stab LA63P: 15 g
Stearic monoamide (melting point, 100° C.): 35 g Production of Second Dispersion The following components were mixed to each other.
Melt mixture: 50 g (produced as above)
1% Sodium dodecylbenzene sulfonate aqueous solution: 440 g Fine particles were then obtained using the high-pressure atomizer (NANO 3000). The resulting white second particles had a volume average diameter of 0.2 μm.

Production of Second Particle B3

Melt Mixture Production

The following components were heat mixed at 180° C., cooled, and pulverized with a mixer to obtain a white melt mixture (powder).
Polyoxyethylene (12) lauryl ether: 15 g
Crystalline polyester (melting point, 100° C.): 35 g Production of Second Dispersion The following components were mixed to each other.
Melt mixture: 50 g (produced as above)
1% Sodium dodecylbenzene sulfonate aqueous solution: 440 g
10% Sodium hydroxide aqueous solution: 10 g Fine particles were then obtained using the high-pressure atomizer (NANO 3000). The resulting white second particles had a volume average diameter of 0.4 μm.

Production of Second Particle B4

Melt Mixture Production

The following components were heat mixed at 180° C., cooled, and pulverized with a mixer to obtain a white melt mixture (powder).
Adek Stab LA77Y: 15 g
Crystalline polyester (melting point, 100° C.): 35 g Production of Second Dispersion The following components were mixed to each other.
Melt mixture: 50 g (produced as above)
1% Sodium dodecylbenzene sulfonate aqueous solution: 440 g
10% Sodium hydroxide aqueous solution: 10 g Fine particles were then obtained using the high-pressure atomizer (NANO 3000). The resulting white second particles had a volume average diameter of 0.4 μm.

Example 1

Production of Mixed Dispersion of First and Second Dispersions

The following components were mixed to produce a blue ink.
First particle A1 dispersion: 10 g
Second particle B1 dispersion: 20 g
Ethylene glycol (drying preventing agent): 1 g Decolor Experiment The blue ink was tested for ejection ability using a PulseInjector (nozzle diameter, 25 μm; Cluster Technology Co., Ltd.). The test confirmed the ejection of the ink.

The ink was then applied to a paper with a bar coater, and allowed to dry at ordinary temperature. As a result, a blue color image with an image density ID of 0.52 was obtained. Heating the image to 120° C. with a hot plate decolored the ink instantaneously, and the decolored state was maintained even at ordinary temperature. The image density ID after the decoloration was 0.1.

Example 2

Production of Mixed Dispersion of First and Second Dispersions

The following components were mixed to produce a blue ink.
   First particle A2 dispersion: 10 g
   Second particle B2 dispersion: 20 g
   Ethylene glycol (drying preventing agent): 1 g
Decolor Experiment The blue ink was tested for ejection ability using a PulseInjector (nozzle diameter, 25 μm; Cluster Technology Co., Ltd.). The test confirmed the ejection of the ink.

The ink was then applied to a paper with a bar coater, and allowed to dry at ordinary temperature. As a result, a blue color image with an image density ID of 0.52 was obtained. Heating the image to 120° C. with a hot plate decolored the ink instantaneously, and the decolored state was maintained even at ordinary temperature. The image density ID after the decoloration was 0.10.

Example 3

Production of Mixed Dispersion of First and Second Dispersions

The following components were mixed to produce a blue ink.
   First particle A3 dispersion: 10 g
   Second particle B3 dispersion: 20 g
   Ethylene glycol (drying preventing agent): 1 g
Decolor Experiment The blue ink was tested for ejection ability using a PulseInjector (nozzle diameter, 25 μm; Cluster Technology Co., Ltd.). The test confirmed the ejection of the ink.

The ink was then applied to a paper with a bar coater, and allowed to dry at ordinary temperature. As a result, a blue color image with an image density ID of 0.41 was obtained. Heating the image to 120° C. with a hot plate decolored the ink instantaneously, and the decolored state was maintained even at ordinary temperature. The image density ID after the decoloration was 0.15.

Example 4

Production of Mixed Dispersion of First and Second Dispersions

The following components were mixed to produce a blue ink.
   First particle A1 dispersion: 10 g
   Second particle B4 dispersion: 20 g
   Ethylene glycol (drying preventing agent): 1 g
Decolor Experiment The blue ink was tested for ejection ability using a PulseInjector (nozzle diameter, 25 μm; Cluster Technology Co., Ltd.). The test confirmed the ejection of the ink.

The ink was then applied to a paper with a bar coater, and allowed to dry at ordinary temperature. As a result, a blue color image with an image density ID of 0.51 was obtained. Heating the image to 120° C. with a hot plate decolored the ink instantaneously, and the decolored state was maintained even at ordinary temperature. The image density ID after the decoloration was 0.09.

Comparative Example 1

Production of Particles Containing Color-Forming Compound, Color-Developing Agent, and Binder Resin The following components were heat mixed at 180° C., cooled, and pulverized with a mixer. However, a colored kneaded product could not be obtained.
   3,3-Bis(p-dimethylaminophenyl)-6-dimethylaminophthalide: 5 g
   Adeka Arkls K5: 10 g
   Amorphous polyester (Tg, 60° C.): 35 g

Comparative Example 2

Production of Particles Containing Color-Forming Compound, Color-Developing Agent, and Binder Resin Melt Mixture Production The following components were heat mixed at 180° C., cooled, and pulverized with a mixer. The resulting kneaded product had a low color density because of poor dispersibility.
   3,3-Bis(p-dimethylaminophenyl)-6-dimethylaminophthalide: 5 g
   Adeka Arkls K5: 10 g
   Polyethylene (melting point, 80° C.): 35 g
Production of Dispersion of Particles Containing Color-Forming Compound, Color-Developing Agent, and Binder Resin (Hereinafter, "dispersion C")

The following components were mixed to each other.
   Melt mixture: 50 g (produced as above)
   1% Sodium dodecylbenzene sulfonate aqueous solution: 440 g
   10% Sodium hydroxide aqueous solution: 10 g The mixture was pulverized with a paint shaker for 24 hours to produce fine particles. The resulting blue particles had a very broad particle size distribution with a volume average diameter of 2.1 μm.
Production of Particles Containing Decoloring Agent
Melt Mixture Production The following components were heat mixed at 180° C., cooled, and pulverized with a mixer to obtain a white melt mixture (powder).
   Adek Stab LA63P: 15 g
   Polyethylene (melting point, 80° C.): 35 g
Production of Dispersion of Particles Containing Decoloring Agent (Hereinafter, "dispersion D")

The following components were mixed to each other.
   Melt mixture: 50 g (produced as above)
   1% Sodium dodecylbenzene sulfonate aqueous solution: 440 g
   10% Sodium hydroxide aqueous solution: 10 g The mixture was pulverized with a paint shaker for 24 hours to produce fine particles. The resulting particles had a very broad particle size distribution with a volume average diameter of 2.5 μm.
Production of Mixed Dispersion of Dispersion C and Dispersion D The following components were mixed to produce a pale blue ink.

Dispersion C: 10 g
Dispersion D: 20 g
Ethylene glycol (drying preventing agent): 1 g
Decolor Experiment The pale blue ink was tested for ejection ability using a PulseInjector (nozzle diameter, 25 μm; Cluster Technology Co., Ltd.). Clogging occurred in the injector, and the ink could not be ejected.

The ink was then applied to a paper with a bar coater, and allowed to dry at ordinary temperature. As a result, a pale blue color image with an image density ID of 0.21 was obtained. Heating the image to 120° C. with a hot plate erased the image instantaneously. The image density ID after the decoloration was 0.10.

Comparative Example 3

Production of Particles Containing Color-Forming Compound, Color-Developing Agent, and Binder Resin Melt Mixture Production The following components were heat mixed at 180° C., cooled, and pulverized with a mixer to obtain a blue melt mixture (powder).
 3,3-Bis(p-dimethylaminophenyl)-6-dimethylaminophthalide: 5 g
 Adeka Arkls K5: 10 g
 Styrene-acryl resin (acid number: 15; Tg, 60° C.) 35 g
Production of Dispersion of Particles Containing Color-Forming Compound, Color-Developing Agent, and Binder Resin (Hereinafter, "dispersion E")
 Melt Mixture: 50 g (produced as above)
 1% Sodium dodecylbenzene sulfonate aqueous solution: 440 g
 10% Sodium hydroxide aqueous solution: 10 g The mixture was pulverized with a paint shaker for 24 hours to produce fine particles. The resulting blue particles had a very broad particle size distribution with a volume average diameter of 1.5 μl.
Production of Particles Containing Decoloring Agent
Melt Mixture Production The following components were heat mixed at 180° C., cooled, and pulverized with a mixer to obtain a white melt mixture (powder).
 Adek Stab LA63P: 15 g
 Styrene-acryl resin (acid number: 15; Tg, 60° C.): 35 g
Production of Dispersion of Particles Containing Decoloring Agent (Hereinafter, "dispersion F")
 The following components were mixed to each other.
 Melt mixture: 50 g (produced as above)
 1% Sodium dodecylbenzene sulfonate aqueous solution: 440 g
 10% Sodium hydroxide aqueous solution: 10 g The mixture was pulverized with a paint shaker for hours to produce fine particles. The resulting particles had a very broad particle size distribution with a volume average diameter of 1.8 μm.
Production of Mixed Dispersion of Dispersion E and Dispersion F The following components were mixed to produce a blue ink.
 Dispersion E: 10 g
 Dispersion F: 20 g
 Ethylene glycol (drying preventing agent): 1 g
Decolor Experiment The blue ink was tested for ejection ability using a PulseInjector (nozzle diameter, 25 μm; Cluster Technology Co., Ltd.). Clogging occurred in the injector, and the ink could not be ejected.

The ink was then applied to a paper with a bar coater, and allowed to dry at ordinary temperature. As a result, a blue color image with an image density ID of 0.42 was obtained. Heating the image to 120° C. with a hot plate erased the image in 30 min. The image density ID after the decoloration was 0.10.

While certain embodiments have been described, these embodiments have been presented by way of example only, and are not intended to limit the scope of invention. Indeed, the novel method described herein may be embodied in a variety of other forms; furthermore, various omissions, substitutions and changes in the form of the ink and method described herein may be made without departing from the spirit of the inventions. The accompanying claims and their equivalents are intended to cover such forms or modifications as would fall within the scope and spirit of the inventions.

As described above, a decolorizable inkjet ink that excels in color development and decoloring capability can be obtained with the techniques described in this specification.

What is claimed is:

1. A decolorizable inkjet ink, comprising:
an aqueous vehicle;
a first particle that disperses in the aqueous vehicle and contains a color-forming compound, a color-developing agent, and a polar group-containing crystalline binder; and
a second particle that disperses in the aqueous vehicle as a particle distinguished from the first particle and contains a decoloring agent and a polar group-containing crystalline binder.

2. The ink according to claim 1,
wherein the first particle and the second particle have a volumetric medium diameter (D50) of less than 1 μm as measured by a laser diffraction scattering method.

3. The ink according to claim 1,
wherein the decoloring agent is a hindered amine derivative.

4. The ink according to claim 1,
wherein the color-developing agent has a molecular chain with a phenolic hydroxyl group, and a molecular weight of at least 1,000.

5. A method for manufacturing a decolorizable inkjet ink, the method comprising:
preparing an aqueous dispersion of a first particle that contains a color-forming compound, a color-developing agent, and a polar group-containing crystalline binder, and an aqueous dispersion of a second particle that contains a decoloring agent and a polar group-containing crystalline binder; and
mixing the aqueous dispersion of the first particle and the dispersion of the second particle to each other for obtaining a mixture which has the first particle and the second particle which is distinguished from the first particle.

6. The method according to claim 5,
wherein the first particle and the second particle are produced with a high-pressure atomizer to have a volumetric medium diameter (D50) of less than 1 μm as measured by a laser diffraction scattering method.

7. The method according to claim 5,
wherein the decoloring agent is a hindered amine derivative.

8. The method according to claim 5,
wherein the color-developing agent has a molecular chain with a phenolic hydroxyl group, and a molecular weight of at least 1,000.

* * * * *